Oct. 6, 1959          D. A. MACDONALD          2,907,365
NONSKID TIRE TREAD AND METHOD AND MEANS FOR MAKING SAME
Filed April 13, 1954          3 Sheets-Sheet 2
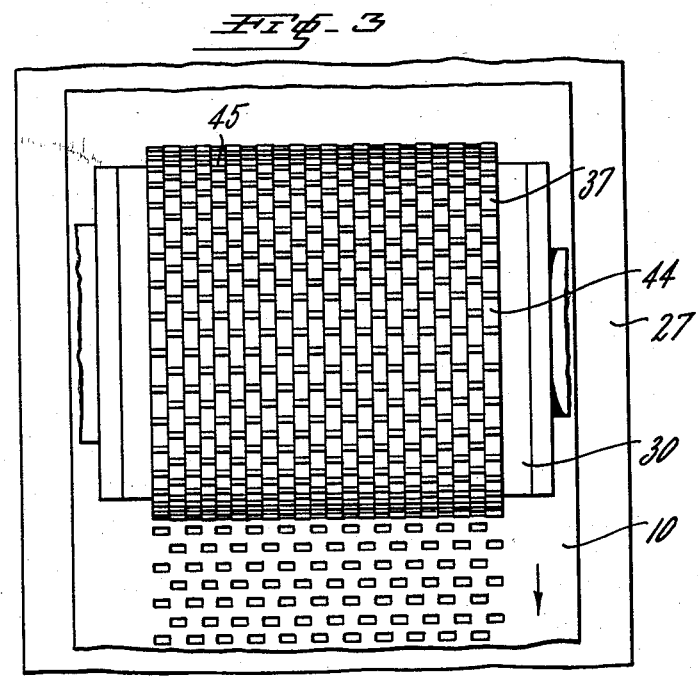
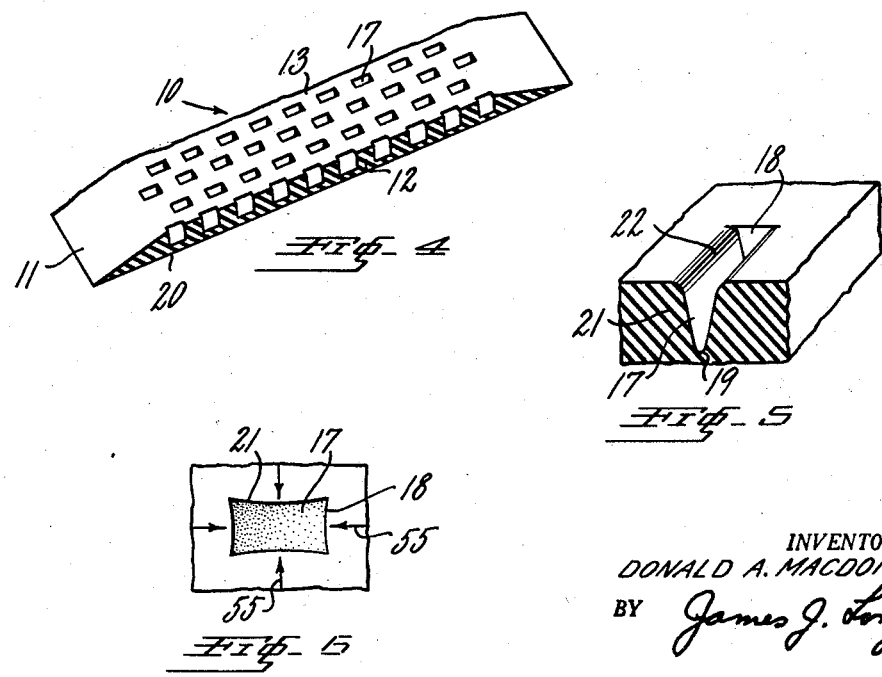
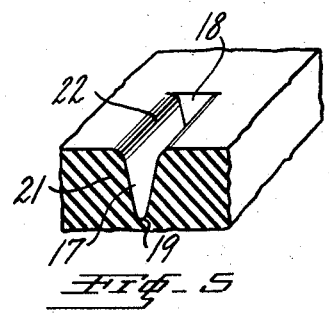
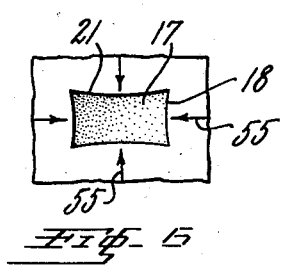
INVENTOR.
DONALD A. MACDONALD
BY James J. Long
AGENT

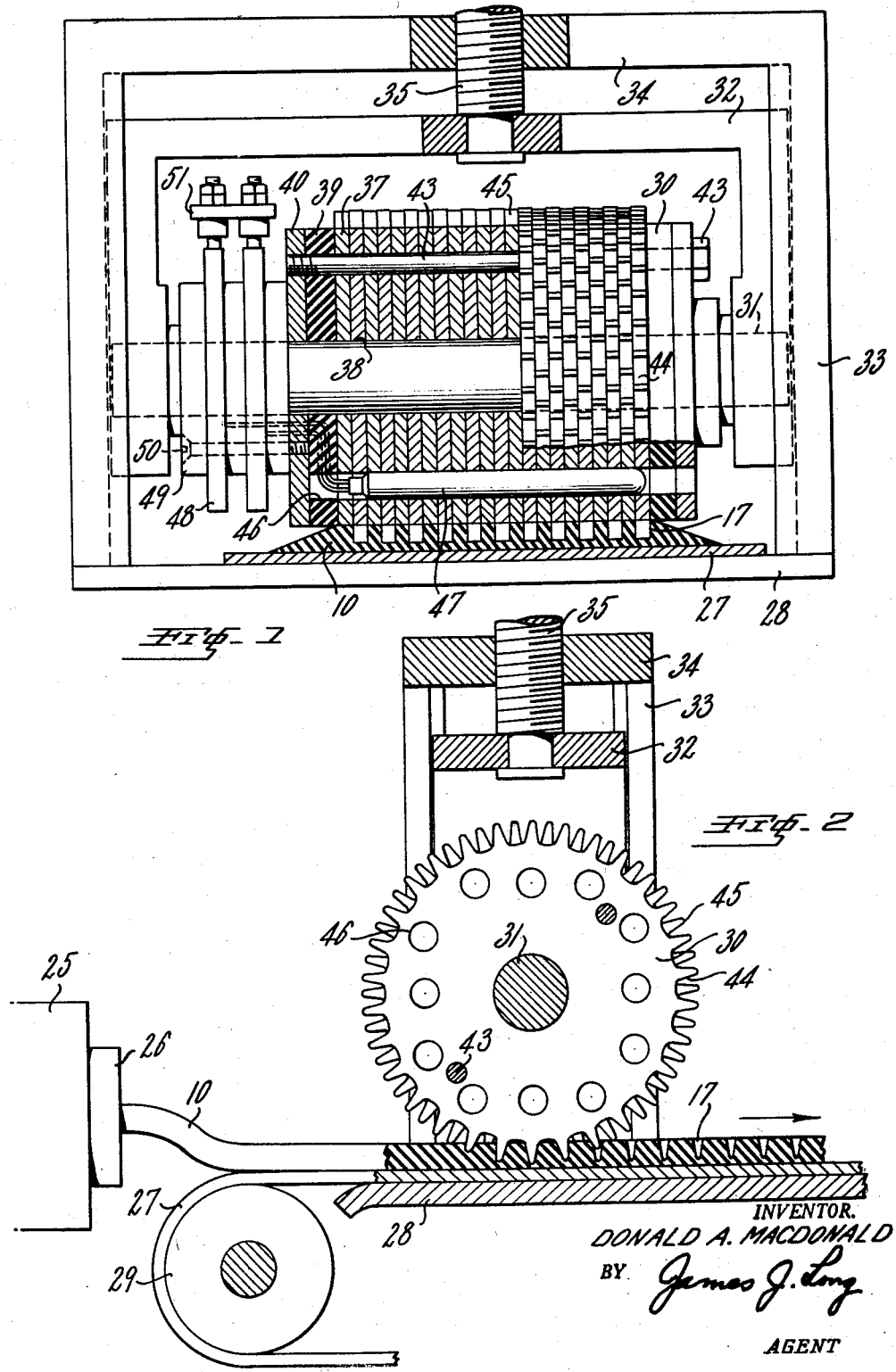

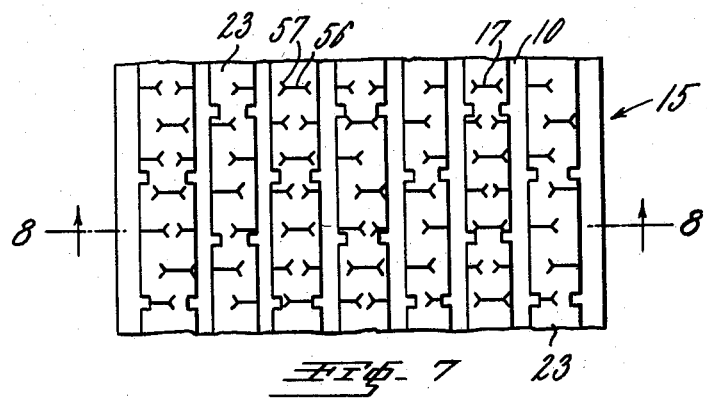
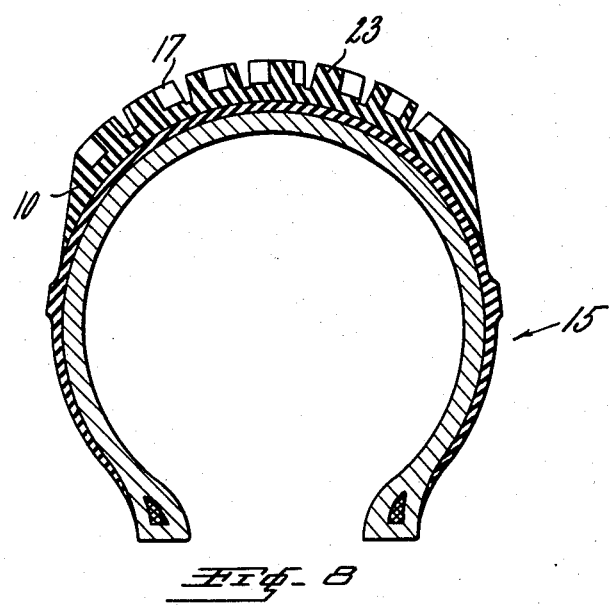
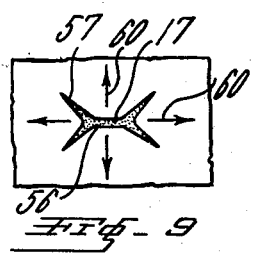

United States Patent Office 2,907,365
Patented Oct. 6, 1959

2,907,365

NONSKID TIRE TREAD AND METHOD AND MEANS FOR MAKING SAME

Donald A. MacDonald, Indianapolis, Ind., assignor to United States Rubber Company, New York, N.Y., a corporation of New Jersey Application April 13, 1954, Serial No. 422,781

9 Claims. (Cl. 152—209)

This invention relates to an improved method and means for making a pneumatic tire provided with nonskid means in its tread surface, as well as to the improved nonskid tire so obtained. The invention also has particular reference to a novel kind of "camelback" for retreading worn tires. More particularly, the invention is concerned with camelback or tread strips that provide finished treads of improved traction, of the kind known as nonskid treads embodying slits in tread surface which serve to grip the road and prevent slipping.

This application is a continuation-in-part of my application Serial No. 336,807, filed February 13, 1953, and now abandoned.

A principal object of the present invention is to provide pneumatic tires, whether new tires or retreaded tires, with a tread embodying nonskid slits of improved form and function.

A further object of the invention is to provide nonskid action in the tire without any necessity for performing a slitting operation on the finished, vulcanized tire tread.

Another object of the invention is the provision of a method and means for treating an uncured tire tread strip, whereby the finally vulcanized tread will contain the desired nonskid action, without further treatment.

Still another object of the invention is to provide a tire embodying nonskid slits having a configuration that is more effective in resisting skidding in a plurality of directions.

It is still a further object of the invention to provide nonskid slits of such construction that they present road gripping edges more readily and more effectively than conventional nonskid slits.

The invention accomplishes the foregoing objects, as well as other objects and advantages, by providing in the uncured vulcanizable rubber strip that constitutes either a tread strip for a new tire or a camelback strip for retreading a tire, a multitude of definitely spaced prevulcanized open transverse slots of substantially greater thickness than the finally desired nonskid slits. Such uncured tread or camelback is intended primarily for use to form a tire tread having essentially continuous circumferential ribs, such ribs being relatively narrow and typically being seven in number. The length of the transverse prevulcanized slots is substantially less than the width of the circumferential ribs, so that the final slits do not destroy the essential continuity and rigidity of the ribs. The tire builder or retreading operator applies this potentially nonskid tread strip or camelback containing the precured slots to a new tire carcass or to a worn tire, and after the new tire or retread is vulcanized in the mold, the outer surface of the tread, in place of being continuous, has a multitude of transverse slits of special shape already formed therein, as will appear in more detail below, so that it is unnecessary to form any additional nonskidding operation on the tire, and these slits provide unusually effective skid resistance because they have an inherent tendency to open and provide a plurality of road-gripping edges disposed in various directions.

The invention will be described in detail with reference to the accompanying drawings, wherein:

Fig. 1 is a transverse elevational view, with parts broken away and parts in section, of a device of the invention for slotting and locally prevulcanizing an uncured tread strip such as camelback in accordance with one method of practicing the invention;

Fig. 2 is a longitudinal similar view, showing the camelback emerging from an extruder and passing through the slotting device of Fig. 1;

Fig. 3 is a fragmentary plan view of the device of Figs. 1 and 2, with parts broken away;

Fig. 4 is a fragmentary perspective view of the slotted camelback of the invention;

Fig. 5 is an enlarged fragmentary perspective sectional view of one of the slots;

Fig. 6 is a fragmentary plan view of one of the slots after a short time has elapsed;

Fig. 7 is a fragmentary plan view of a tire retreaded with such camelback, showing how the slots assume a special configuration in the finished tire;

Fig. 8 is a transverse sectional view of the tire taken along line 8—8 of Fig. 7; and Fig. 9 is a fragmentary plan view on an enlarged scale of one of the nonskid slots in the finished tire.

In practicing the invention, the uncured tread strip or camelback strip composed of vulcanizable rubber stock in a comparatively soft and plastic state, is impressed with a plurality of open prevulcanized slots of predetermined width, according to a definite predetermined pattern. Such slots are typically of rectangular form and they ordinarily extend only partially through the depth of the tread, preferably to a depth equal to what is known as the "antiskid depth," that is, the depth of the usual grooves in the finished tread. The precured slots are located over the area of the upper face of the tread strip that will ultimately constitute the road contacting surface of the tire tread. The slots are formed by pressing suitably shaped blunt prongs or projections into the rubber, thereby displacing the stock and leaving, when withdrawn an open void extending inwardly from the surface of the tread. The length of the open slots transversely of the tread strip is less than the width of the circumferential ribs subsequently to be impressed during cure of the tire in the vulcanizing mold. In accordance with the invention the slots are prevulcanized, that is, the walls of the slots are vulcanized while the bulk of the tread is still in the raw, unvulcanized state. Such local prevulcanization of the surfaces of the open slots is conveniently effected simultaneously with the formation of the slots. The prevulcanization extends from the walls or the surfaces of the slots into the body of the tread stock for a perceptible distance, so as to provide in effect a thin skin of vulcanized rubber surrounding the slot, or so as to provide in effect what may be regarded as an insert of vulcanized rubber in which the slot is defined. As a result of the stresses set up as a consequence of the deformation of the stock in impressing the slots, and as a result of the deformation and flow of stock which takes place about the prevulcanized walls of the slots when the tread is subsequently molded, the slots in the finished molded tire are found to take on a very peculiar configuration, as will appear in more detail below, that is unexpectedly effective in providing antiskid action in a plurality of directions.

Referring to the drawings, and in particular to Fig. 4, there is shown therein a strip 10 of raw camelback of the invention having tapered or vertical side marginal zones 11 and a thicker central zone 12 having a plane upper surface 13 that will eventually become the road contacting surface of the tread of the finished tire 15 (Figs. 7 and 8). The central area of the unvulcanized strip is punctured with a plurality of longitudinal rows of prevulcanized rectangular slots 17, the slots in alternate rows being in staggered relation. The precured slots 17 extend into the uncured strip perpendicularly to the surface 13 (Fig. 4) and they have a definite width dimension, as represented by end walls 18 (Figs. 5 and 6) and a bottom wall 19 spaced from the under-surface 20 (Fig. 4) of the strip.

The sides of the slots are defined by opposed spaced walls 21 (Fig. 5) which are rounded at their upper edges 22 and which descend into the body of the strip at an angle, so that the slots are narrower at the bottom than at the surface opening. Each slot extends transversely over the longitudinal axis of the strip for a distance that is somewhat less than the principal width of the ribs 23 (Figs. 7 and 8) of the final tread.

To precure the slots 17 in the uncured camelback strip there is provided, as shown in Figs. 1 and 2, a device associated with an extruder 25 (Fig. 2) which initially forms the camelback strip 10 by extruding vulcanizable rubber stock at an elevated temperature through a shaping die 26, whence it is deposited upon a moving take-off conveyor belt 27 that is carried along the upper surface of a supporting table 28 by the usual driving means including a roller 29. A drum 30 is disposed transversely above the moving strip 10 at a point spaced from but in proximity to the extruder 25. The drum 30 is supported on a shaft 31 that is rotatably mounted at its ends within a fork-like support 32. The support 32 is slidably mounted for vertical adjustment upon side members 33 of a frame extending upwardly from the supporting table 28. An upper horizontal cross-piece 34 of the frame carries a vertically extending adjusting screw 35 at its center, by means of which the supporting yoke 32 carrying the drum 30 may be raised or lowered to vary the distance between the lower surface of the drum and the upper surface of the conveyor belts.

The drum 30 is constructed of a series of parallel adjacent disks or plates 37 (Fig. 1) each having a central axial hole 38 through which the shaft 31 passes snugly. At each end of the bank of plates 37 there is provided a spacer member or gasket 39 of resilient material, and at the outer surface of each of said gaskets there is provided a rigid end plate 40. Retaining bolts 43 pass through the assembly near the outer periphery of the drum through suitable holes to maintain the members firmly in place. The outer peripheral face of each of the plates 37 has cut-away portions 44 that define equally spaced radially extending vulcanizing prongs 45. Alternate plates are so arranged that the vulcanizing prongs are staggered. The prongs are rounded at their bases where they are joined to the drum, and they are gradually tapered outwardly to correspond to the previously described shape of the precured slots 17 which they are intended to form.

A series of holes 46 passing axially of the drum 30 near the periphery thereof serve to accommodate electrical resistance heating elements 47 that are supplied with electric current through commutator rings 48 mounted on a collar 49 secured at one end of the drum by screws 50. A brush and terminal assembly 51 mounted above the commutator rings serves to connect them to an outside source of electric current (not shown). The heat supplied by the elements 47 serves to raise the vulcanizing prongs 45 to such an elevated temperature that they are capable of effecting vulcanization of the portions of the camelback strip with which they come in contact.

The operation of the device is such that the warm plastic raw camelback strip 10 advances with the moving conveyor belt 27 into contact with the heated vulcanizing prongs 45 of the drum 30, thereby causing the drum to rotate at a peripheral speed equal to the rate of advancement of the camelback. The prongs 45 are thus impressed into the upper surface of the camelback strip, thereby displacing the soft plastic stock and forming the slots 17 therein, and at the same time, by reason of the elevated temperature of the prongs 45, the walls of the slots 17 become substantially fully vulcanized for an appreciable distance from the sides, bottom and end surfaces of the slots, with the result that they are fixed in the shape described, and, by reason of the inherent elasticity of the thus produced vulcanized layer of rubber defining the slots, the slots always retain a tendency to return to the shape initially imparted to them by the vulcanizing prongs. The precured slots in this respect may be regarded as local vulcanized elastic inserts or islands contained within the surrounding body of the still plastic, raw, unvulcanized rubber stock. In the preferred practice of the invention the prongs have rounded bases, as indicated, and they are wider toward their bases than they are at their terminal ends. The result of this is that the surfaces of the prongs maintain better contact with the walls of the slots in the rubber stock than would otherwise be possible. Such improved contact insures better heat transfer and makes possible the desired more complete vulcanization of the walls of the slots, to provide a skin of stock in an advanced state of cure surrounding each slot. The speed of advancement of the stock, and the temperature of the stock and of the prongs, are such that the walls of the slots are subjected to vulcanizing temperature for an appreciable period of time, sufficient to cause cure of the walls of the slots. Those skilled in this art will be sufficiently conversant with the rates of cure of various kinds of tread stock formulations to judge the length of contact time suitable to achieve cure at any selected temperature.

It will be apparent that during the operation of forming the slots, a certain amount of the raw rubber stock, representing the volume of the slot, is displaced from its former position in the camelback strip. The rubber stock has a certain amount of "elastic memory" as a consequence of which the displaced stock has a definite tendency to return to its former position, that is, it tends to flow back and fill in the slot. However, since the walls of the slot are now vulcanized in a definite position and shape, the walls resist this tendency of the surrounding stock to fill in the hole. As a result, the precured slot takes on the appearance shown in Fig. 6, wherein the arrows 55 represent the elastic memory forces of the raw stock, that produce a perceptible bulging in of the sidewalls and end walls 18 until the elastic memory forces are balanced by the resistance to deformation offered by the vulcanized wall of the slot.

When the camelback strip manufactured in this manner is applied to a worn pneumatic tire casing 15 (Figs. 7, 8), and vulcanized in the usual retreading mold, the elevated temperature and the molding pressure result in a further inward flow of the stock toward the center of the slot, with the result that the slots assume the odd slitted configuration shown in Fig. 7, and on a larger scale in Fig. 9. It will be seen that the additional inward flow of stock from the sidewalls and end walls of the slots during the cure of the tread produces what is essentially a narrow slit 56, each end of which has two diverging forked portions 57 pointing into what were formerly the respective corners of the slot. A comparison of the shape of this slit with the former shape of the slot as shown in Fig. 6, will reveal that the final shape is the result of further action or forces in the directions of the arrows 55.

It is important to note that the shape of the final forked slits 56, 57 in the finished tire represents a pronounced deformation of the original essentially rectangular shape in which the slots were first vulcanized. The walls of the slits, even after the final vulcanization of the tire, are possessed of a definite tendency to return to their original unvulcanized shape, that is, the final vulcanization does not entirely obliterate the inherent shape of the precured slots. Therefore, there exist in the finished tire forces acting outwardly of the slits, as indicated by the arrow 60 in Fig. 9, which represent the tendency of the walls of the slit to reassume the former rectangular shape in which the slots were first prevulcanized. These outward forces are limited in their action because the surrounding body of vulcanized rubber resists deformation. Therefore, the slits remain normally essentially closed in the finished tire, that is, the opposed walls of the slits are in contact. However, when the tread surface is in contact with the road there is a tendency for the slits to open up at least slightly, especially under the influence of any slipping forces, and the thus-opened slits present sharp road-gripping edges which provide great resistance against skidding. The unusual readiness with which the present slits open up to present anti-skidding edges is believed to be in large part a consequence of the existence of the forces 60 tending to return the slits to the prevulcanized form of the slots. In Fig. 9, the slit 56, 57 is represented as partially opened to provide a small slot 17. Improvement in skid resistance and traction of the order of 30% has been noted as a result of this construction.

The slits are effective in preventing skidding not only in the line of direction of rotation of the tire, but they are also highly effective against sidewise or lateral skidding, or skidding in any direction intermediate between a forward direction and a side direction, because of the plurality of forked outwardly diverging portions of the slits. This capability of the invention of providing nonskid action in a plurality of directions is a decided advantage of the invention, that could not readily be realized by the conventional methods of nonskidding, involving making cuts in the finished tire. The split or forked construction of the angularly disposed ends of the slits is also believed to contribute to the ease with which the slits open up in use. This construction also renders the slits more flexible.

By precuring slots of a length less than the width of the tread ribs as described, it is possible to provide effective nonskid action without destroying the essential continuity and rigidity of the tread ribs. Because this method of nonskidding does not impair the stability of the ribs, it is possible to make the precured nonskid slits extend deeper into the tread without danger, and nonskid action can therefore be provided for the full depth of the tread, so that even after the tire has been worn considerably it is still skid resistant. In contrast to this, conventional nonskidding is made comparatively shallow of necessity, and wears off after a period of time, after which the tire is no longer skid resistant unless the nonskidding is renewed.

Because the present nonskid slits have their origin in an operation performed on the raw tread stock, the invention is equally applicable to camelback intended for retreading tires, or to the ordinary uncured tread of a new tire, either before or after such tread is applied to the tire carcass. Because the walls of the slots are essentially fully cured for an appreciable depth from the wall surfaces of the slots, there is no possibility of opposing walls of the slots becoming stuck together during the subsequent molding, and therefore it is unnecessary to introduce any undesirable lubricants into the slots before molding to prevent sticking.

The practice of the invention with camelback makes the improved nonskid tread more universally available, since no special nonskidding equipment is required and any retreading operator can provide a nonskid tread of the present improved kind simply by employing the camelback of the invention containing the prevulcanized slots.

Having thus described my invention, what I claim and desire to protect by Letters Patent is:

1. A pneumatic tire having a vulcanized rubber tread, said tread being provided with a plurality of spaced transverse nonskid slits each having a straight central portion terminating at each of the opposite ends thereof in a plurality of radially extending arm portions, those local portions of said tread defining the walls of said slits being prevulcanized in advance of the main body of said tread to ensure that each slit is rendered more flexible and opens more readily to present anti-skid edges in several different directions under the influence of traction forces.

2. A pneumatic tire having a vulcanized rubber tread, said tread having in its surface a plurality of spaced nonskid slits defined by locally prevulcanized areas having the inherent shape of slots with opposed wall surfaces spaced from each other by a greater distance than opposed walls of said slits, said opposed walls being displaced toward each other in the completely vulcanized tread by the vulcanized body of the tread surrounding said locally prevulcanized areas, and said prevulcanized areas possessing an inherent tendency to return to the shape of the said slots in which they were originally prevulcanized, whereby the said slits in the finished tread display a tendency to open readily under the influence of traction forces exerted between the tread and a road surface, to provide comparatively sharp anti-skid edges which prevent slipping of the tread on the road surface.

3. A pneumatic tire having a vulcanized rubber tread, said tread having in its surface a plurality of spaced nonskid slits defined by locally prevulcanized areas having the inherent shape of rectangular slots with opposed end wall and side wall surfaces spaced from each other by a greater distance than the opposed walls of said slits, said opposed end walls and side walls being deformed toward each other to convert said slots into the shape of slits with forked ends.

4. A pneumatic tire having a vulcanized rubber tread, said tread being provided with a plurality of circumferentially extending essentially continuous ribs, said tread having in its surface a plurality of spaced nonskid slits having a length less than the width of said ribs, said slits having a straight central portion and forked diverging ends, said slits being formed of prevulcanized rectangular slots deformed by surrounding vulcanized tread stock into slits of the said configuration.

5. A pneumatic tire having a vulcanized rubber tread, said tread being provided with a plurality of circumferentially extending substantially continuous ribs, said ribs being separated by intervening grooves of definite antiskid depth, said ribs being provided with a plurality of spaced transverse nonskid slits of length less than the width of said ribs and of depth substantially as great as the depth of the said tread grooves, said slits having a straight central portion and outwardly diverging forked end portions, said slits being formed of prevulcanized rectangular openings which are deformed inwardly into the shape of said slits by the surrounding vulcanized rubber tread stock.

6. Camelback for retreading a pneumatic tire comprising an uncured tread strip of vulcanizable rubber stock having in its surface a plurality of definitely spaced locally prevulcanized areas defining open slots, which, when the camelback is subsequently vulcanized in a retreading mold, become nonskid slits possessing an inherent tendency to open readily and present anti-skid edges by reason of the inherent tendency of the slits in the finished vulcanized tread to return to the original shape of the prevulcanized slots.

7. Camelback for providing a worn pneumatic tire with a new tread having relatively narrow circumferentially extending ribs comprising an uncured strip of vulcanizable rubber tread stock having a plurality of locally prevulcanized areas, each such prevulcanized area containing an open slot defined by spaced prevulcanized walls, said slots extending transversely of the said strip and having a length less than the width of the said ribs.

8. A method of making a nonskid pneumatic tire comprising in combination the steps of shaping a plastic vulcanizable rubber stock into the form of a tire tread, pressing prongs heated to vulcanizing temperature into the surface of the plastic tread stock to impress slots therein, maintaining the said heated prongs in contact with the tread stock for a sufficiently long period to prevulcanize locally the walls of the slots and thereby impart to the slots a definite structure which resists subsequent inward plastic flow of the surrounding uncured stock, and thereafter completing the vulcanization of the tread on a tire casing in a mold under heat and pressure, whereby the said surrounding stock is displaced inwardly and converts said slots into slits which have an inherent tendency to open up by reason of the propensity of the prevulcanized walls to return to the shape in which they were originally prevulcanized.

9. A method of making a nonskid pneumatic tire comprising in combination the steps of providing an uncured vulcanizable rubber tread strip, locally prevulcanizing a plurality of definitely spaced areas defining open slots, said slots having spaced opposed relatively long longitudinal walls representing the length of the slots transversely of the tread and spaced opposed relatively shorter end walls representing the thickness of the slots, said slots being shorter than the transverse width of circumferential ribs subsequently to be impressed on the tread so as not to destroy the essential continuity and rigidity of such ribs, and subsequently vulcanizing the tread strip on a tire casing in a mold under heat and pressure, the said longitudinal walls and the said end walls of the slots being deformed inwardly during the said molding to form slits having outwardly diverging forked ends, the resulting slits possessing a tendency to open up and present anti-skid edges that resist slipping in a plurality of directions by reason of an inherent tendency of the slits to return to the original prevulcanized shape of the slots.

References Cited in the file of this patent

UNITED STATES PATENTS

| | | |
|---|---|---|
| D. 71,059 | Freelander | Sept. 17, 1926 |
| D. 72,553 | Galvin | May 3, 1927 |
| 1,438,231 | Goodenberger | Dec. 12, 1922 |
| 2,109,691 | D'Ayguesvives | Mar. 1, 1938 |
| 2,207,100 | Maynard | July 9, 1940 |
| 2,261,025 | Havens | Oct. 28, 1941 |
| 2,345,518 | Wendel | Mar. 28, 1944 |
| 2,421,097 | Lakso | May 22, 1947 |
| 2,515,201 | Dulmage et al. | July 18, 1950 |
| 2,612,928 | Buddenhagen | Oct. 7, 1952 |
| 2,654,124 | Layte | Oct. 6, 1953 |

FOREIGN PATENTS

| | | |
|---|---|---|
| 391,253 | Great Britain | Apr. 27, 1933 |